Nov. 11, 1958 P. C. JURS 2,859,758
FUSIBLE VALVE IN LIQUEFIED GAS SYSTEM
Filed Sept. 10, 1952 2 Sheets-Sheet 1

INVENTOR.
Peter C. Jurs
BY
Hudson & Young
ATTORNEYS

Nov. 11, 1958   P. C. JURS   2,859,758
FUSIBLE VALVE IN LIQUEFIED GAS SYSTEM
Filed Sept. 10, 1952   2 Sheets-Sheet 2

INVENTOR.
P. C. JURS
BY
Hudson & Young
ATTORNEYS

United States Patent Office

2,859,758
Patented Nov. 11, 1958

2,859,758

FUSIBLE VALVE IN LIQUEFIED GAS SYSTEM

Peter C. Jurs, Berkeley, Calif., assignor to Phillips Petroleum Company, a corporation of Delaware Application September 10, 1952, Serial No. 308,885

10 Claims. (Cl. 137—73)

This invention relates to fusible valves. In another aspect, it relates to fluid dispensing systems incorporating such fusible valves.

In dispensing fluids, particularly liquefied petroleum gas, from a storage vessel or tank, many precautions and safety features are necessary for handling this volatile and highly flammable material. In patent 2,538,806 to T. A. St. Clair, entitled Quick-Closing Valve and Storage Tank Containing Same, there is disclosed a tank for liquefied petroleum gas having a motor valve through which fluid is introduced into the tank or dispensed therefrom. The motor valve comprises a valve head normally urged into engagement with a valve seat by a spring, the valve head being connected to a fluid-pressure operated motor which is operable to cause movement of the valve head away from the seat, thereby to open the valve. In dispensing fluid from the tank, the fluid passes through the valve, a strainer, and a pump to the dispensing conduit, and the pressure downstream of the pump is applied through an auxiliary or pilot conduit to the valve motor so as to hold it in open position. Should the pressure downstream of the pump be reduced, as by breakage of the line, the pressure effective upon the motor is reduced and the valve closes, thereby preventing passage of further fluid from the tank. When fluid is pumped into the tank, the pressure of the incoming fluid forces the valve head away from the seat to permit the fluid to enter. When the fluid supply is interrupted, the fluid pressure against the valve head is reduced and the valve spring urges the head into engagement with the seat, thereby closing the valve.

In accordance with this invention, one or more fusible valves are provided which connect the pilot conduit (which, in effect, forms a part of the dispensing conduit) downstream of the pump with a low pressure part of the system, such as the pump suction. Should a fusible valve be heated to an excessive temperature, as by fire, the valve opens and the pressure in the pilot conduit is decreased. As a result, the pressure applied to the motor valve is reduced and this valve closes, thereby preventing further flow of fluid from the tank. In a preferred construction of the fusible valve, a T connection is provided in the valve body so that a plurality of such valves can be conveniently inserted at one or more places in the pilot conduit downstream of the pump. As a result, excessive temperature encountered at any one of a plurality of spaced locations causes the motor valve to close so as to prevent further flow of fluid from the vessel. It is a feature of the invention that the fusible valve is of closed construction and is connected between a high pressure part and a low pressure part of the system so that, when the fusible valve opens, no material from the system can escape to the atmosphere.

Accordingly, it is an object of this invention to provide an improved system for dispensing liquefied petroleum gas from a container.

It is a further object of this invention to provide a system wherein the dispensing valve on a tank is automatically closed when excessive temperatures are encountered at one of a plurality of spaced positions in the dispensing system.

It is a still further object to provide a fusible valve which is simple in construction, reliable in operation, and which can be conveniently assembled into a dispensing system.

Various other objects, advantages and features of the invention will become apparent from the following detailed description taken in conjunction with the accompanying drawings, in which.

Figure 1:
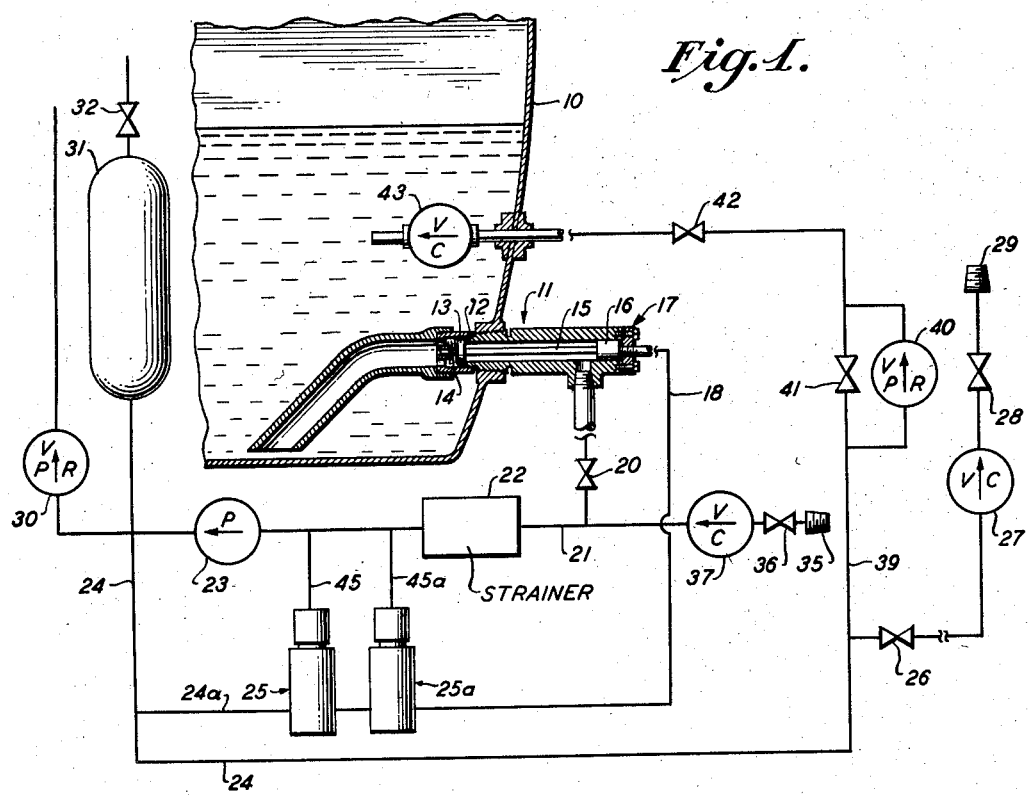
Figure 1 is a schematic view of a dispensing system constructed in accordance with the invention.

Referring now to the drawings in detail and particularly to Figure 1, I have shown a vessel or tank 10 adapted for storage of liquefied petroleum gas. The vessel can be provided with a pressure relief valve communicating with the vapor phase in the upper part of the tank, a vapor withdrawal line, a flow-actuated liquid-level indicator, and a pressure gauge, as set forth in the aforementioned St. Clair Patent 2,538,806. These parts are not shown nor described in this application since they form no part of the present invention.

Communicating with the liquid phase within the tank is a motor valve 11 including a valve seat 12, a valve head 13, and a spring 14 urging the valve head into engagement with the valve seat. A rod 15 contacting the valve head is connected to a piston 16 movable axially within a piston chamber 17 to which pressure fluid can be supplied through a line 18. Spring 14 normally urges valve head 13 into engagement with the valve seat 12. However, when pressure fluid is admitted through line 18, the piston moves in a leftward direction, Figure 1, thereby causing the valve to open. This permits liquid to flow from the tank through a valve 20, conduit 21, and a strainer 22 to the intake or suction of a pump 23. A dispensing conduit 24 is connected to the outlet or discharge of the pump, this conduit communicating with an auxiliary or pilot conduit 24a extending through a fusible valve 25. In accordance with the invention, a plurality of additional fusible valves can be connected in conduit 24a as desired, one such additional valve being indicated by reference numeral 25a. Dispensing conduit 24 also leads to a valve 26 communicating with a check valve 27, a valve 28, and a dispensing fitting 29. As optional features, a pressure relief valve 30 and a surge tank 31 having an outlet valve 32 can be connected to the dispensing conduit 24. It will be understood that, broadly speaking, pilot conduit 24a forms a part of dispensing conduit 24, although the full discharge of the pump does not flow through the pilot conduit.

The pressure in pilot conduit 24a is communicated to chamber 17 of motor valve 11 so that, after the dispensing operation is initiated, the pressure created in the dispensing conduit by the pump causes piston 16 to hold valve 11 in open position. It will be understood that valve 11 is manually moved to open position, as by a cam, not shown, to initiate the dispensing operation, the pressure produced by the pump thereafter maintaining the valve in open position. Should a break occur in the dispensing conduit, the pressure therein is reduced with resultant reduction of the pressure in chamber 17, thereby permitting spring 14 to close the valve 11 and prevent the escape of further fluid from the tank 10.

The tank is also provided with a filling line including a fitting 35, a valve 36, and a check valve 37 which communicates through valve 20 with the interior or barrel of valve 11. When fluid is pumped into fitting 35 under pressure, the valve head 13 is moved away from the seat and the fluid enters the tank, the spring 14 closing the valve when the filling pressure is cut off. As an optional feature, a return line 39 can lead from dispensing conduit 24 through a pressure relief valve 40 bypassed by a valve 41 through a valve 42 and a check valve 43 into the tank. If an excessive pressure exists in the dispensing conduit, a portion of the fluid therein is bypassed through valve 40 back into the storage tank.

As will become apparent, fusible valve 25 is normally closed. However, when the valve is exposed to an excessive temperature, for example, due to fire, communication is established through the valve body by melting of fusible material in the valve between pilot conduit 24a and a low pressure part of the system. The low pressure part of the system can be any portion thereof upstream of the pump, including the storage vessel itself, or the atmosphere. It will be understood, of course, that it is seldom desirable that the fusible valve discharge to the atmosphere although this is comprehended by the broader aspects of the invention. Preferably and advantageously, fusible valve 25 communicates through a line 45 with the suction or intake of pump 23 downstream of the strainer 22. When the fusible material melts and the valve opens in the described manner, the pressure in the pilot conduit is reduced with resultant reduction of the pressure in piston chamber 17. Accordingly, valve head 13 of valve 11 is urged into engagement with valve seat 12 by the spring 14 so that no further fluid can flow from the storage vessel into the dispensing system. It is a feature of the invention that a plurality of additional fusible valves can be inserted in the pilot line, each of these valves being connected with the suction of pump 23, as by a line 45a, or with another low pressure portion of the dispensing system. One such additional fusible valve is indicated by reference numeral 25a. When a plurality of such valves are used, an excessive temperature encountered adjacent any one of the valves will release the pressure in pilot conduit 24a and cause valve 11 to close in the manner already described. The construction of the fusible valves is such that they form, in effect a T connection so that they can be conveniently inserted in series in the pilot conduit 24a. In some instances, it is desirable to locate an orifice in conduit 24a upstream of the fusible valve so as to assure rapid closing of valve 11 responsive to the melting of the fusible material in valve 25.

Figure 2:
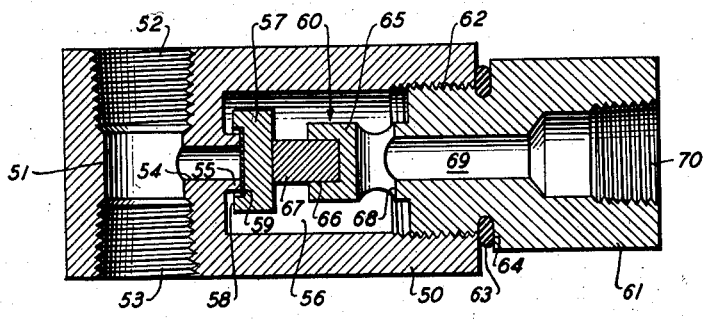
Figure 2 is a vertical sectional view of the fusible valve of the invention.

In Figure 2, I have shown a fusible valve of novel design adapted for use as the fusible valve 25 of Figure 1. This valve comprises a generally cylindrical body 50 having a diametrically extending opening 51 formed at one end thereof, this opening being provided with threaded end portions 52 and 53. Formed in the valve body is an axial passage 54 which communicates, at one end thereof, with the opening 51. The other end of passage 54 is shaped to form a valve seat 55 and the passage communicates through the valve seat with an enlarged chamber 56 formed in the valve body 60.

Cooperating with the valve seat 55 is a valve head 57 having a flanged portion 58 within which is received a sealing disk or gasket 59. Valve head 57 is normally held in sealing engagement with valve seat 55 by a rigid assembly 60 extending between the valve head and the valve body. In Figure 2, this assembly comprises two members, one of which is a plug 61 movable axially within the chamber 56 on screw threads 62. The plug has a sealing gasket 63 fitted within an annular recess 64, this gasket sealing the region between the plug and valve body when the plug is screwed into the passage 56.

The plug has an inner portion 65 of reduced diameter protruding into the chamber 56, and the inner end of this protruding portion has a recess 66 formed therein. The other member of rigid assembly 60 is a rod or piece 67 of fusible material, one end of which is received within recess 66, the other end engaging the valve head 57. The fusible material can be, for example, Wood's metal, or any other suitable alloy which melts when the temperature of the valve body becomes excessive, for example, lead, tin, bismuth alloys. Where the valve is used in a propane dispensing system, it is desirable that the fusible element have a melting point of approximately 165° F.

Formed in the protruding portion 65 between recess 66 and the body of plug 61 is a diametrically extending bore 68 which communicates with an axial passage 69 formed in the plug 61, the passage 69 having an outer screw threaded end portion 70.

In operation, the valve is inserted in pilot conduit 24a, Figure 1, so that the fluid in this conduit passes through the diametrical opening 51, and the passage 69 is connected to line 45 communicating with the intake of pump 23 or other suitable low pressure part of the system. In effect, this forms a T connection and permits one or more of the valves to be readily connected in series in the pilot conduit. Accordingly, several valves can be disposed at separate locations along this conduit.

When fusible rod 67 is intact, the valve head 57 is held in sealing engagement with the valve seat by the pressure transmitted to the valve head through the fusible rod 67 from plug 61 which is screwed into the chamber 56 a sufficient distance as to obtain a tight seal. In this connection, it will be noted that the use of the sealing gasket 59 is optional as a slight leakage through the valves does not produce any harmful result in the system. Should the valve body be exposed to an excessive temperature, resulting, for example, from a fire adjacent the pilot conduit, the fusible rod 67 is melted, thereby allowing the valve head to be moved away from the seat by the fluid in pilot conduit 24a and opening 51. As a result, fluid bleeds from opening 51 through passage 54, valve chamber 56, bore 68, passage 69, and line 45 to the intake of pump 23 or other low pressure part of the system. The resulting reduction in pressure in pilot conduit 24a reduces the pressure effective in piston chamber 17 and permits valve 11 to be closed by the action of spring 14, thereby preventing the flow of fluid from vessel 10. It will be evident that the fusible valve is of very simple construction, no difficult sealing problems are encountered, and very reliable operation is obtained.

Figure 3:
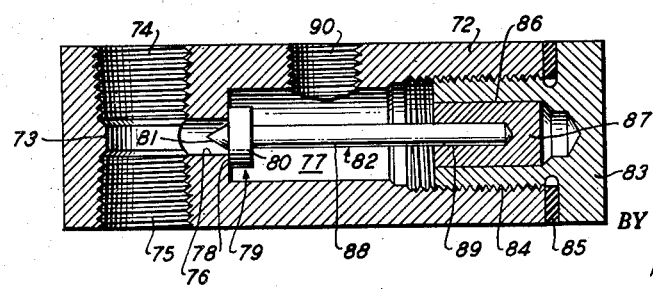
Figure 3 is a vertical sectional view, partially in elevation, of a modified form of fusible valve.

In Figure 3, I have shown a modified valve structure including a generally cylindrical valve body 72 provided at one end thereof with a diametrical opening 73 having threaded end portions 74 and 75. Formed in the body 72 is an axial passage 76, one end of which communicates with opening 73 and the other end of which communicates with a chamber 77 formed in the body 72. The end of passage 76 adjacent chamber 77 is shaped to form a valve seat 78 with which cooperates a valve head 79 comprising a disk 80 engaging the valve seat and a tapered pointed end 81 protruding into the passage 76, this pointed end portion facilitating the opening of the valve by the pressure in opening 73, in the manner hereinafter explained. A rigid assembly 82 connects the valve head 80 with the body 72, this assembly including three cooperating members. The first member is a plug 83 which is movable axially within the chamber 77 upon threads 84, a sealing gasket 85 being provided between the head of the plug and the valve body. A generally cylindrical recess 86 is formed in the plug, this recess communicating with the chamber 77. Mounted within the recess 86 is a generally cylindrical insert 87 of fusible metal which constitutes the second member of rigid assembly 82. The third member of rigid assembly 82 is a metal rod 88, one end of which is suitably secured to the valve head 79, the other end of the rod extending into a complementary recess 89 formed in the fusible insert 87. A radial threaded port 90 is formed in the valve body 72 and communicates with the chamber 77.

In operation, plug 83 is screwed inwardly until the valve head fits tightly into engagement with the valve seat, the rigid assembly 82 maintaining these parts in engagement. It will be understood that, if desired, a sealing gasket can be provided between the valve head and valve seat, although the provision of such a gasket is ordinarily not necessary. The valve is inserted in pilot conduit 24a so that opening 73 forms a part of this conduit, and the opening or port 90 is connected to line 45 communicating with the pump intake or other low pressure part of the system. In effect, this forms a T connection so that one or more of the valves can be conveniently placed in series in the pilot conduit. When the valve body is exposed to an excessive temperature, fusible insert 87 melts and allows the valve head 79 to be moved away from the valve seat by the pressure of fluid in opening 73. Thereupon, the pressure in the pilot conduit 24 is reduced by the bleeding of fluid through opening 73, passage 76, chamber 77, port 90, and line 45 to the pump intake or other low pressure part of the system, the pressure drop in pilot conduit 24a causing valve 11 to close in the manner previously explained. The valve structure shown in Figure 3 is advantageous in that the fusible insert 87 is relatively remote from the fluid in opening 73 and there is little circulation of fluid in the chamber 77. As a result, the cooling action of such fluid upon the fusible insert is reduced, thereby improving the valve operation when the valve is exposed to excessive temperatures.

Figure 4:
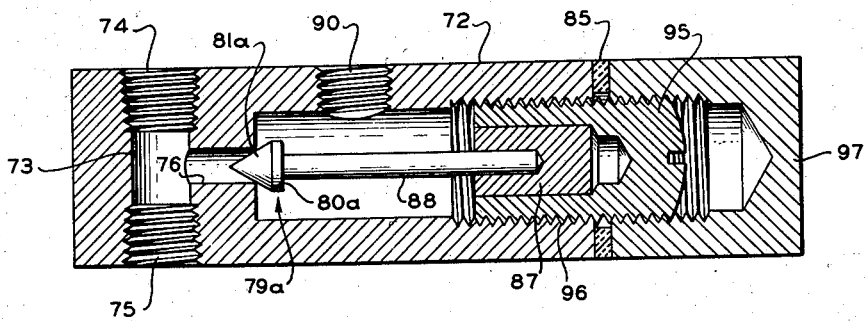
Figure 4 is a vertical sectional view, partially in elevation, of a still further modified form of fusible valve.

The structure of Figure 4 is generally similar to that of Figure 3 and corresponding parts are indicated by like reference numerals. In this modification, it will be noted that a modified valve head 79a includes a cylindrical portion 80a spaced from the valve seat together with a frusto-conical tapered portion 81a protruding into the passage 76 to maintain the valve in closed position. It will be further noted that the fusible insert 87 is received within a holder 95 which is threaded at 96 to the interior of the valve body 72, a cap 97 being threaded to the outer portion of the holder 95 and engaging the sealing gasket 85.

In the modified structure, a more efficient closing and opening action is obtained by having the frusto-conical portion of the valve head coact with the valve seat, and the combination of holder 95, and cap 97 facilitate the construction and assembly of the parts making up the fusible valve. It will be noted in this modification, as in the other modifications, the valve body is closed except for the passages through which is is connected to the high pressure and low pressure parts of the system. Accordingly, when the fusible element melts and the valve opens, there is no escape of the fluid from the system into the atmosphere.

While I have described the operation of the valve in conjunction with a system for dispensing fluids, such as liquefied petroleum gas, it will be understood that the valve has other applications. Wherever a fusible relief valve is required, the passage 51 or 73 and port 70 or 90 are connected to the respective parts of the system between which fluid flow is to occur responsive to an excessive temperature adjacent the valve body. Thereupon, communication is established between these parts of the system when the fusible piece or insert is melted responsive to the temperature of the valve body becoming excessive.

While the invention has been described in connection with present, preferred embodiments thereof, it is to be understood that this description is illustrative only and is not intended to limit the invention.

I claim:

1. In combination with a storage tank for a liquefied gas, a liquefied gas handling system comprising a pump, a liquid eduction conduit connecting said storage tank to the intake side of said pump, a liquid return conduit connecting the exhaust side of said pump and said storage tank, a motor valve in said eduction conduit at a point inside said storage tank, a second valve in said return conduit, a pressure relief valve connecting said second valve turn conduit between said pump and said second valve to the atmosphere, a surge tank connected to said return conduit between said pump and said second valve, a dispensing conduit connected to said return conduit between said pump and said second valve and leading to a dispensing end, a liquid feed line connected to said eduction conduit between said pump and said motor valve, a pressure conduit connecting the return line between the pump and said second valve with the said motor valve, and a fusible valve connecting said pressure conduit with the intake side of said pump, said valve opening upon exposure thereof to an excessive temperature.

2. In combination with a storage tank for liquefied gas, a liquefied gas handling system comprising a pump, a liquid eduction conduit connecting said storage tank to the intake side of said pump, a dispensing conduit connected to the exhaust side of said pump and having a dispensing end, a shut off valve controlling flow through said eduction conduit to substantially cut off flow in a closed position, means biasing said shut off valve to closed position, a motor connected to open said shut off valve, a pressure fluid supply conduit connecting said dispensing conduit and said motor to supply pressure fluid from said pump to open said shut off valve, and a fusible relief valve connecting said pressure fluid supply conduit with the intake side of said pump whereby, upon opening of said fusible valve responsive to an excessive temperature, fluid is bled from said pressure fluid supply conduit with resultant closure of said shut off valve.

3. In a system for dispensing liquefied petroleum gas, in combination, a storage vessel for liquefied petroleum gas, a fluid-pressure operated motor valve communicating with said vessel and a discharge line, said valve being normally closed and being moved to open position by fluid pressure applied to the valve motor, a pump, a line connecting the intake of said pump to said discharge line, a dispensing conduit attached to the pump outlet, a line connecting said dispensing conduit with the valve motor, and a fusible valve connecting said line with a low pressure part of the dispensing system, said fusible valve opening responsive to an excessive temperature to reduce the pressure applied to said motor and thereby cause said motor valve to close.

4. In a system for dispensing liquefied petroleum gas, in combination, a storage vessel for liquefied petroleum gas, a fluid pressure operated motor valve communicating with said vessel and a discharge line, said valve being normally closed and being moved to open position by fluid pressure applied to the valve motor, a pump, a line connecting the intake of said pump to said discharge line, a dispensing conduit attached to the pump outlet, a line connecting said dispensing conduit with the valve motor, and a fusible valve connecting said line with the intake of said pump, said fusible valve opening responsive to an excessive temperature to reduce the pressure applied to said motor and thereby cause said motor valve to close.

5. In a system for dispensing liquefied petroleum gas, in combination, a storage vessel for liquefied petroleum gas, a fluid pressure operated motor valve communicating with said vessel, said valve being normally closed and being moved to open position by fluid pressure applied to the valve motor, a pump, a line connecting the intake of said pump to said valve, a pilot line connecting the pump outlet to the valve motor, a fusible valve connecting said pilot line with a low pressure part of the dispensing system, said fusible valve opening responsive to an excessive temperature to reduce the pressure applied to said valve motor and thereby cause said valve to close, and at least one additional fusible valve connected to said pilot line, each additional valve communicating with a portion of the system upstream of said pump, whereby opening of any fusible valve responsive to an excessive temperature causes the pressure upon said valve motor to decrease and thereby closes said motor valve.

6. In a system for dispensing liquefied petroleum gas, in combination, a storage vessel for liquefied petroleum gas, a fluid-pressure operated motor valve communicating with said vessel, said valve being normally closed and being moved to open position by fluid pressure applied to the valve motor, a pump, a line connecting the intake of said pump to said valve, a dispensing conduit attached to the pump outlet and connected with the valve motor, and a fusible valve connecting said dispensing conduit with a low pressure part of the dispensing system, said fusible valve comprising a valve body, a valve seat formed in said body, a valve head engaging said valve seat, and rigid means forcing said valve head into engagement with said valve seat, said rigid means including a portion of fusible material whereby, when the valve body is exposed to an excessively high temperature, the fusible portion melts and permits the valve head to become disengaged from the valve seat.

7. In a system for dispensing liquefied petroleum gas, in combination, a storage vessel for liquefied petroleum gas, a fluid-pressure operated motor valve communicating with said vessel and a discharge line, said valve being normally closed and being moved to open position by fluid pressure applied to the valve motor, a pump having its intake connected to said discharge line, a dispensing conduit attached to the pump outlet, a pilot line connecting said dispensing conduit with the valve motor, and a fusible valve connecting said pilot line with a low pressure part of the dispensing system, said fusible valve comprising a generally cylindrical valve body, an opening extending diametrically of said body at one end thereof and disposed in said pilot line, an axial passage communicating at one end thereof with said opening, the valve body being constructed and arranged to define a valve seat at the other end of said passage, an enlarged chamber communicating with said passage at the region of said valve seat, a valve head engageable with said valve seat to close said passage, a threaded plug movable axially toward and away from the valve head in said chamber, means for sealing the region between said plug and said valve body, said plug having a protruding portion extending into said chamber with a cylindrical recess at the inner end thereof, a rod of fusible material fitting within said recess and engaging said valve head whereby, upon movement of the plug toward the valve head, the valve head is forced into sealing engagement with the valve seat, and a fluid passageway extending through said plug into the valve chamber, said passageway communicating with said low pressure part of the dispensing system.

8. In a system for dispensing liquefied petroleum gas, in combination, a storage vessel for liquefied petroleum gas, a fluid-pressure operated motor valve communicating with said vessel, said valve being normally closed and being moved to open position by fluid pressure applied to the valve motor, a pump, a line connecting the intake of said pump to said valve, a dispensing conduit attached to the pump outlet, a pilot line connecting said dispensing conduit with the valve motor, and a fusible valve connecting said pilot line with a low pressure part of the dispensing system, said fusible valve comprising a generally cylindrical valve body, an opening extending diametrically of said body at one end thereof and disposed in said pilot line, an axial passage communicating at one end thereof with said opening, the valve body being constructed and arranged to define a valve seat at the other end of said passage, an enlarged chamber formed in said valve body communicating with said passage, a valve head mounted within said chamber and engageable with said valve seat, a plug threaded within said passage and movable axially therein, a body of fusible material connecting said valve head with the inner end of said plug, and a fluid passageway formed in said body and communicating with said chamber, said passageway communicating with said low pressure part of the dispensing system.

9. In a system embodying a conduit normally having a high pressure maintained therein wherein an emergency shut-down condition is brought about by release of the pressure in said conduit, in combination, a plurality of fusible valves each including a generally cylindrical valve body, an opening extending diametrically of said body at one end thereof, an axial passage communicating at one end thereof with said opening, the valve body being constructed and arranged to define a valve seat at the other end of said passage, a valve head cooperating with said valve seat to close said passage, a rigid assembly connected at one end to the valve head and at the other end thereof to the vave body to force said valve head into engagement with said valve seat, said assembly including a member formed from fusible material whereby, when the valve body is exposed to an excessive temperature, the fusible member melts and permits the valve head to be disengaged from the valve seat, and a conduit including a first section connected to one end of the diametrical opening in the first valve, additional sections connecting the other end of each such opening to one end of the diametrical opening in the next succeeding valve, and a last section connecting the other end of the diametrical opening in the last valve to an emergency shut-down device, and means connecting the body of each valve upstream of the valve head to a region wherein the pressure is substantially less than the normal pressure existing in said conduit.

10. In a system for handling volatile flammable fluids wherein a pilot conduit supplies high pressure fluid to an emergency shut-down valve to maintain such valve in open condition, a plurality of fusible valves each including a generally cylindrical valve body, an opening extending diametrically of said body at one end thereof, an axial passage communicating at one end thereof with said opening, the valve body being constructed and arranged to define a valve seat at the other end of said passage, a valve head cooperating with said valve seat to close said passage, a rigid assembly connected at one end to the valve head and at the other end thereof to the valve body to force said valve head into engagement with said valve seat, said assembly including a member formed from fusible material whereby, when the valve body is exposed to an excessive temperature, the fusible member melts and permits the valve head to be disengaged from the valve seat, and a fluid passageway communicating with said valve chamber upstream of the valve head, a pilot conduit having a first section connecting a high pressure source of the fluid to be handled to one end of the diametrical opening in the first valve, at least one additional section connecting the other end of each such diametrical opening with one end of the diametrical opening in the next succeeding fusible valve, and a last section connecting the other end of the diametrical opening in the last valve to said shut-down valve, said fusible valves being disposed at locations where an excessive temperature rise would create a dangerous condition, and a line common to all of said fluid passageways and communicating with a part of the system wherein the pressure is substantially lower than the normal pressure existing in said pilot conduit required to maintain said motor valve in open position.

References Cited in the file of this patent

UNITED STATES PATENTS

| 14,628 | Harrison | Apr. 8, 1856 |
|---|---|---|
| 229,695 | Granger | July 6, 1880 |
| 904,134 | Kilbourn | Nov. 17, 1908 |
| 1,578,046 | Logan | Mar. 23, 1926 |
| 1,744,977 | Lovekin | Jan. 28, 1930 |
| 1,924,417 | Ryan | Aug. 29, 1933 |
| 1,924,869 | Lovekin | Aug. 29, 1933 |
| 2,362,724 | Shea | Nov. 14, 1944 |
| 2,588,157 | Olson | Mar. 4, 1952 |

FOREIGN PATENTS

| 530,601 | Germany | Sept. 18, 1931 |